UNITED STATES PATENT OFFICE.

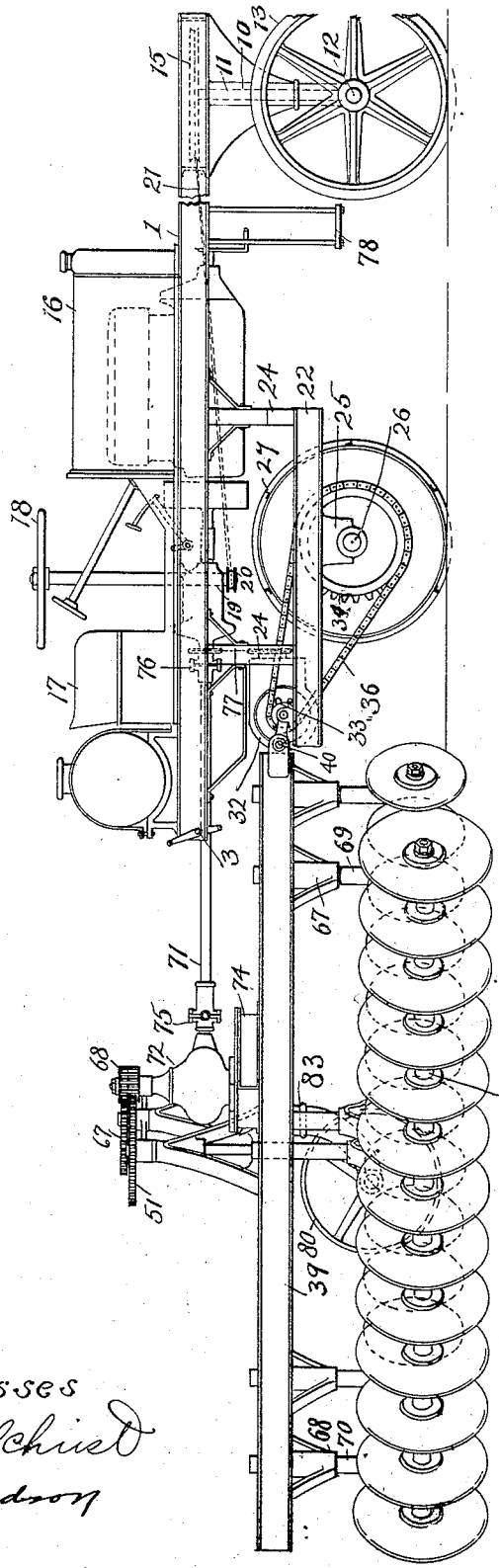

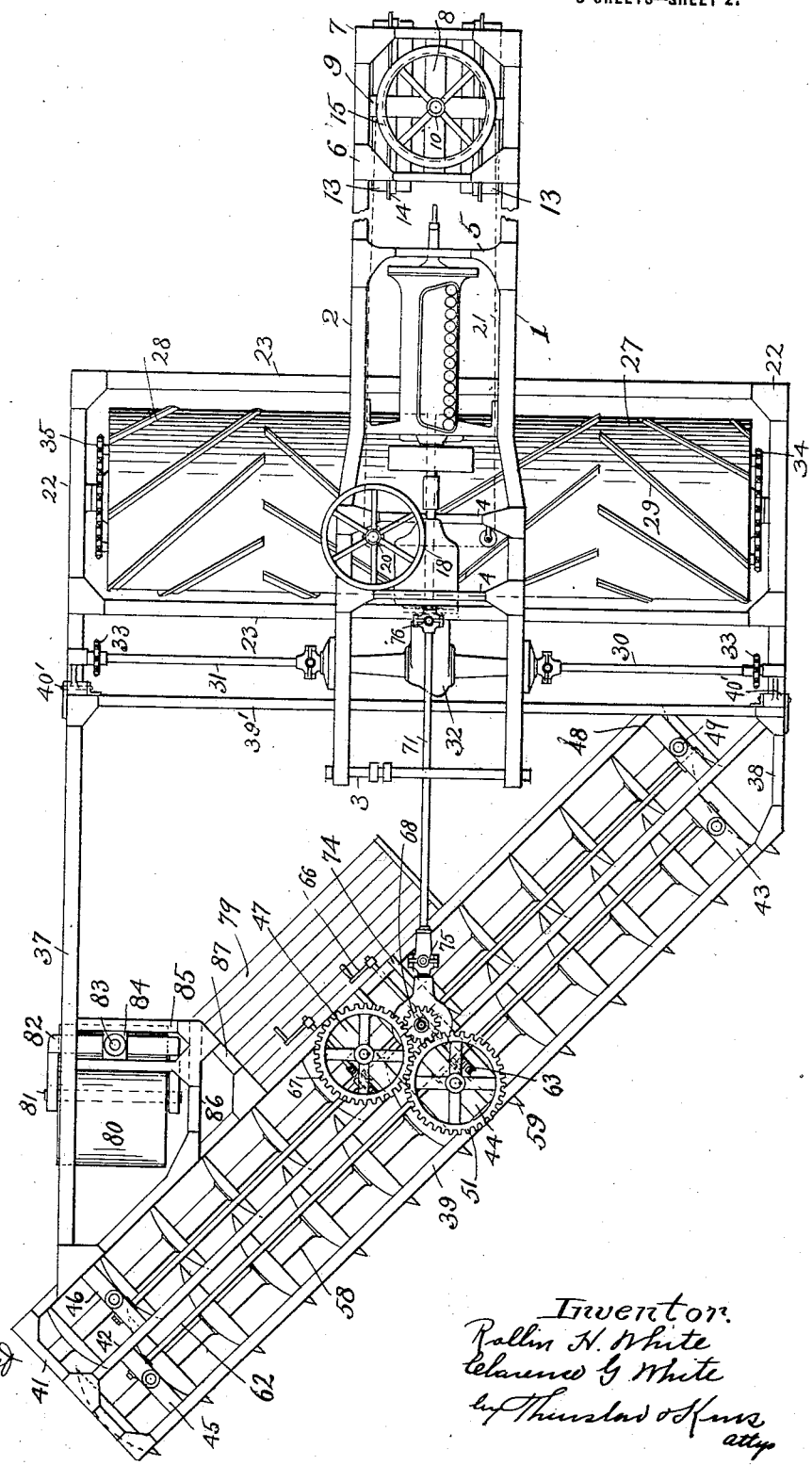

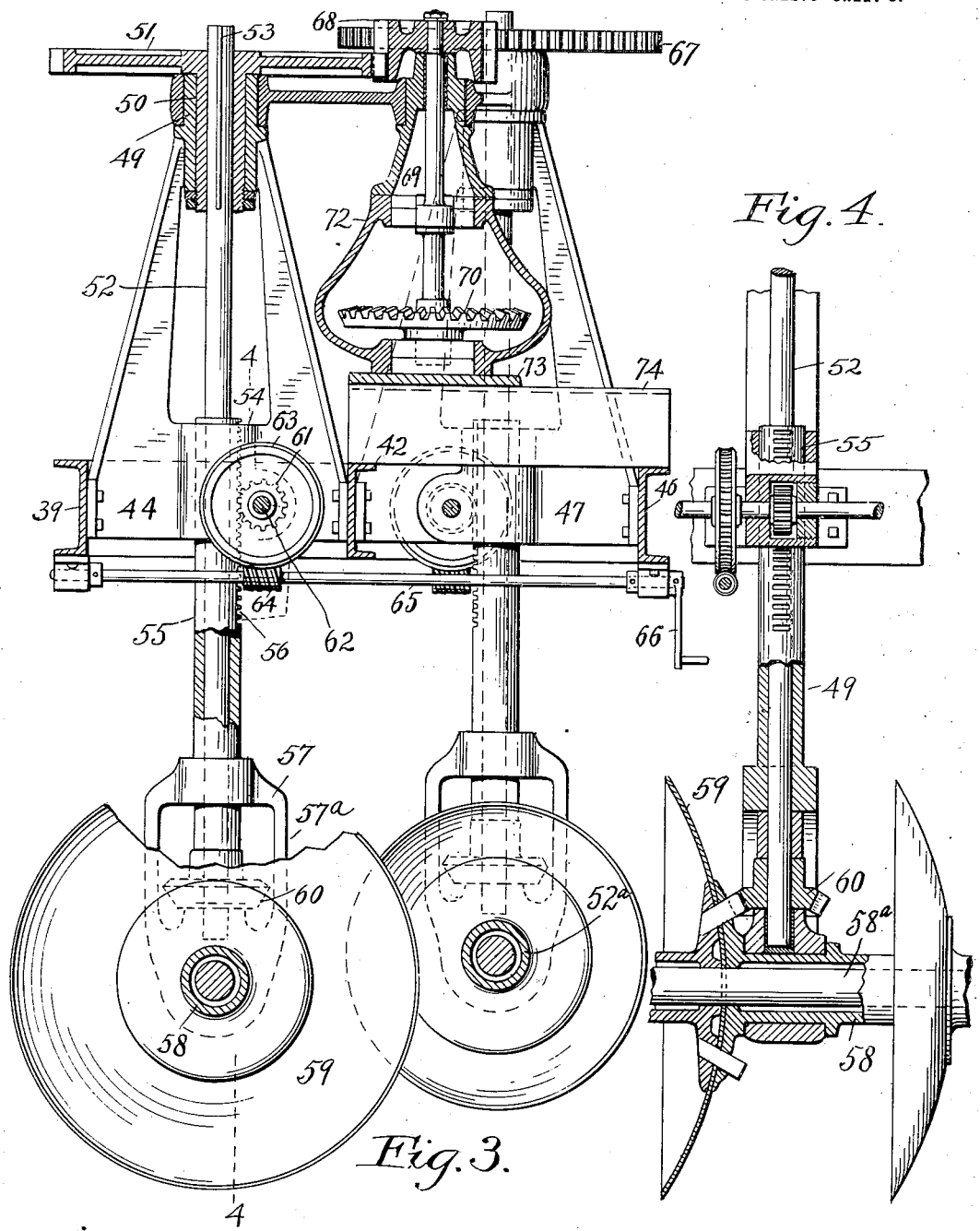

ROLLIN H. WHITE, OF CLEVELAND HEIGHTS, OHIO, AND CLARENCE G. WHITE, OF HAIKU, TERRITORY OF HAWAII, ASSIGNORS TO THE CLEVELAND TRACTOR COMPANY, OF EUCLID, OHIO, A CORPORATION OF OHIO.

AGRICULTURAL MACHINE.

1,258,286. Specification of Letters Patent. Patented Mar. 5, 1918.

Application filed March 31, 1913. Serial No. 757,764.

*To all whom it may concern:*

Be it known that we, ROLLIN H. WHITE and CLARENCE G. WHITE, citizens of the United States, and residents, respectively, of Cleveland Heights village, in the county of Cuyahoga and State of Ohio, and Haiku, Maui, Territory of Hawaii, have invented a certain new and useful Improvement in Agricultural Machines, of which the following is a full, clear, and exact description.

This invention relates to power propelled agricultural machines.

The object of the invention is to provide a machine of the character stated, which will, in a unitary structure, combine the power plant and certain implements which shall work upon the soil. In the embodiment shown in this application we have disclosed the invention embodied in the form of a power propelled disk, harrow and plow. However, it will be understood that we do not limit ourselves to the precise embodiment here shown, except wherein the claims shall particularly specify.

Generally speaking, the invention comprises the elements and combinations thereof set forth in the accompanying claims.

Reference should be had to the accompanying drawings forming a part of this specification, in which Figure 1 is a side elevation of a self propelled plow and harrow. Fig. 2 is a top plan view of the machine. Fig. 3 is an elevation with certain parts in section showing the mechanism by which the disks are rotated; and Fig. 4 is a partial section upon line 4—4 of Fig. 3.

The machine comprises a chassis, the side members of which are represented at 1 and 2. At the rear end these side members are connected by a cross member 3, upon which are mounted certain levers for operating the brakes. The side members of the chassis are also connected by cross pieces 4, and toward the forward end thereof there is a special cross piece 5 which supports the forward end of the power plant.

The chassis is extended beyond the power plant and is at this forward extension provided with cross pieces 6 and 7 which support brackets 8 and 9. These brackets provide a central vertical journal represented at 10 in Fig. 1, in which is journaled a shaft 11. This shaft is mounted centrally upon a sleeve through which extends the axle 12. Upon opposite ends of the axle are wheels 13, which wheels are provided with flat peripheries and a flange 14 which extends at right angles to the periphery of the wheel. Upon the upper portion of the shaft 11 is mounted a grooved wheel 15, which, when turned, causes the wheels 13 to be turned, and in this manner the steering of the device is accomplished. The operative connections of this wheel 15 will be later described.

The power plant for the machine is indicated generally at 16, and comprises an engine, together with the usual appurtenances as used in motor vehicles. A seat indicated at 17 is mounted upon the chassis behind the power plant and grouped adjacent to the seat, to provide easy manipulation, are the various levers, both hand and foot, by which the power plant is operated and changes of the gearing effect, and by which the brakes of the device may be operated.

There is also a steering wheel 18 connected with a shaft 19, the lower portion of which is provided with a grooved wheel 20. Extending between the grooved wheel 20 and the grooved wheel 15 at the forward part of the chassis is a cable 21, so that turning movement imparted to the wheel 18 will be transmitted to the wheel 15 and effect the turning of the wheels 13 to accomplish the desired steering of the machine.

Depending from the chassis is a sub-frame having side members 22 and transversely extending members 23,—these members forming a substantially rectangular frame which is jointed to the chassis by the vertically extending members 24. In this manner the sub-frame becomes virtually a part of the chassis frame and to all intents and purposes is a part thereof.

The side members 22 of this sub-frame are provided with journals 25 which form a support and journal for a transversely extending shaft 26. Upon this shaft are loosely mounted two cylindrical drums 27 and 28, these drums meeting or substantially meeting near the center of the sub-frame, so that in effect the surface of the drums is continuous, and they form a traction roller, which not only serves to provide traction that the machine may move along the ground, but also serves as a roller to roll down the ground, which, perhaps, has been previously broken by a plow. These rollers 27 and 28 are provided with obliquely extending projections 29 which may assume the form of angle irons, and, as will be apparent, they provide a gripping means between the ground so that the rolls may produce a good traction with the ground.

This sub-frame also carries transversely extending shafts 30 and 31 which are driven from a gearing housed within the gear box 32. This gearing may be of the usual differential type, so that under certain conditions the shafts 30 and 31 may rotate at different speeds.

Near the outer ends of these shafts sprocket wheels 33 are provided, and in alinement with these sprockets 33 are other sprockets 34 and 35 which are carried respectively by the rolls 27 and 28. Chains form the driving connection between these sprockets 33 and the sprockets 34 and 35, one such chain being shown at 36 in Fig. 1.

At the rear portion of the machine is a frame which is provided with side members 37 and 38 and with a transversely extending member 39' which joins the side members 37 and 38 at the forward end. At these forward corners of the frame are hinges or pivotal connections as represented at 40', by which connections the implement frame is pivoted upon the side members 22 of the sub-frame. Extending diagonally between the side members 37 and 38 of the implement frame is a rectangular frame which carries the device for working upon the soil. This frame comprises the side members 39 and 40, and an end member 41. The side members 39 and 40 at one of their ends joining respectively to the transverse member 39, and the side member 38 of the implement frame. There is also a frame member 42 which extends substantially centrally and longitudinally between the side members 39 and 40. This member 42 being joined to the end member 41 and at the point of meeting of the sides 38 and 39 of the implement frame.

This frame which carries the implements for operating upon the ground is provided with cross members 43, 44, 45, 46, 47 and 48, which extend between the side members 39, 40 and the central member 42. The cross members 44 and 47 are formed with upwardly extending brackets which at their upper end are provided with journals, as indicated at 49. Through the journal there extends a hub 50 of a gear 51 and through the hub 50 passes a shaft 52, which is provided with a spline 53 so that the shaft 52 may move longitudinally with respect to the hub, but the hub and shaft must turn together.

The central portion, or cross member 44, is enlarged to form a bearing, as indicated at 54, and through this bearing there extends a sleeve 55 provided with rack teeth 56 upon one portion thereof. This sleeve at the lower portion carries a bracket 57 having two side arms represented at 57ᵃ and at the lower portion this bracket forms a journal through which extends a tubular shaft 58. Shaft 58ᵃ extends through the tubular shaft 58 and serves to hold together the sections of the shaft 58 between the disks 59.

Upon the tubular shaft are mounted the disks 59, these disks being mounted upon this tubular shaft in any desired manner. The particular disk which is adjacent the sleeve 49 is provided with gear teeth which are adapted to engage with a gear 60 carried by the shaft 52 at the lower end thereof. This gear occupies the space between the arms of the bracket 57, and the shaft extends through the sleeve 55, as will be clearly seen from Figs. 3 and 4. It will thus be seen that the sleeve 55, as will be clearly seen from Figs. 3 and 4, may be raised or lowered without destroying the driving relationship between the gear 60 and the teeth carried by the disk 59 or the mounting for this disk.

The teeth 56 upon the sleeve 55 are engaged by a pinion 61, which is mounted upon a shaft 62. There is also mounted upon this shaft 62 a worm wheel 63 which is engaged by a worm 64, the worm being carried by a transversely extending shaft 65 which may be operated in any desired manner, and for the purpose I have shown a handle 66. It will be obvious that the turning of the handle 66 will cause the rotation of the worm gear, worm wheel and pinion 61, thereby raising or lowering the sleeve 55 in accordance with the direction in which the handle 66 is turned.

The cross members 43 and 45 which connect the side members 39 and 42 of the frame which carries the disks have depending from them, brackets which are represented at 67, 68. These brackets provide a journal for shafts 69 and 70,—these shafts at their lower ends forming journals for the hollow shaft 58. The shafts are also provided with rack teeth which engage with pinions carried by the shaft 62, so that the shafts 69 and 70 may be raised and lowered in the same manner as the sleeve 55 which has heretofore been described. It will be obvious that the pinions will be operated simultaneously inasmuch as they are all upon the shaft 62. Therefore the entire gang of disks which are carried upon the hollow shaft 58 will be raised and lowered simultaneously.

The driving relationship between the shaft 52 and the disk 59 which has just been described drives the entire shaft 58 so that all the disks upon this shaft are turned simultaneously.

In the present type of machine there are two gangs of disks shown of different diameters. The second gang of disks is mounted upon the frame and operated in the same manner as that which has just been described with respect to the gang of larger disks.

The shaft 52ª which drives the smaller disks is operatively connected with the gear 67 in the same manner as was described with respect to the shaft 52 and the gear 51. Both of these gears mesh with a gear 68 which is carried upon a shaft 69. This shaft at its lower end is provided with a gear 70 which meshes with a driving gear carried upon the end of the power shaft 71.

The shaft 69 and the gear 70 are housed within a casing 72 which at its lower end is provided with a bearing for the shaft 69 and at its upper end is also provided with a bearing. The shaft 69 extends without the casing and upon that portion of the shaft which is outside of the casing the gear 68 is secured.

The casing 72 is mounted upon a plate 73 which is supported by a cross member 74 which extends between the frame members 40 and 42.

The power shaft 71 is provided with a universal joint at 75 and also at 76. In this manner the power shaft is flexible, thus making a perfectly flexible connection between the forward part of the machine which carries the power plant, and the rear portion of the machine which carries the implements for operating upon the ground.

A platform 79 depends from the frame and is intended to be occupied by the person who is to manipulate the cranks by which the gangs of disks are raised or lowered. These disks may be operated to cut more or less into the soil at the discretion of the operator.

Near the rear portion of the frame which carries the implements for operating upon the soil is mounted a roller 80 which has a broad flat surface. This roller has a centrally extending shaft 81 which at its ends is mounted in arms of a yoke 82. This yoke is provided with a neck 83 which is journaled in a member 84, which member 84 is mounted upon cross pieces 85 and is suitably joined to the frame member 40 by the braces 86 and 87.

This roller serves to support the rear end of the frame and, as will be seen, it engages the ground in advance of the disks. Consequently it will support the rear portion of the frame at a substantially fixed distance above the ground. The forward part of the frame which carries the implement will be supported by virtue of its engagement with the sub-frame upon which the traction rollers 27 and 28 are mounted. It will be understood that the neck 83 is free to turn in its journal so that the roller 80 may accommodate itself to any direction in which the machine as a whole is caused to turn by the steering thereof.

An operative connection is provided between the power shaft and the gearing within the casing 32. This connection, as shown, is made by means of a chain gear which is generally represented at 77.

At the forward portion of the chassis there is a depending platform 78 upon which one may stand in cranking the engine.

From the foregoing description, it will be clear that by the provision of two gangs of disks we are enabled to use a set of smaller diameter and a set of larger diameter.

The smaller ones will take a light cut into the soil which requires less power than to take a deeper cut. However, the deeper and wider cut is obtained by following the lighter cut with the disks of larger diameter which make the deeper and wider cut the more easily.

We are also enabled by the construction disclosed to rotate these disks and to adjust their heights so as to vary their cutting depth independently and with ease.

We do not limit ourselves to the particular angle with which the disks cut into the ground, although we have found that in practice a cut at 45 degrees with respect to the direction of travel is to all intents and purposes a very satisfactory operating condition.

Obviously the two gangs of disks may be of any relative sizes, or of the same size and further a single gang of disks may be used where desired.

Having described our invention, we claim:

1. In a machine of the character described, the combination with a chassis of a power producing device carried thereby, an annular traction member supporting the chassis, operative connections between the traction member and the power device, an implement frame secured to the chassis, a plurality of gangs of disks carried by said frame, said disks being of different diameters in respective gangs and the several gangs being arranged parallel to each other, the disks being set to operate upon the soil in a direction which is oblique with respect to the direction of travel of the machine, and operative connections between the disks and the power device whereby the disks are driven.

2. In a machine of the character described, the combination with the chassis, an auxiliary frame extending transversely of the chassis, and beneath the same, means for joining the chassis and the auxiliary frame, a rearwardly extending frame hingedly secured to the auxiliary frame, devices for engaging the soil carried by the rearwardly extending frame, and a roller supporting the rearwardly extending frame at one portion thereof.

3. In a machine of the character described, an implement frame flexibly supported, a plurality of gangs of disks supported by said frame, the gangs being arranged parallel to each other, and means for driving the said disks.

4. In a machine of the character described, an implement frame flexibly supported, a plurality of gangs of disks arranged parallel to each other, carried by said frame, and means for independently raising and lowering the gangs of disks.

5. In a machine of the character described, a power producing device, an implement frame flexibly supported by the machine, a plurality of gangs of disks of different diameters carried by the said frame, the said gangs being arranged parallel to each other and oblique with respect to the direction and travel of the machine and operative connections between the disks and the power device whereby the disks are driven.

6. In a machine of the character described, a power producing device, an implement frame flexibly supported by the machine, a plurality of gangs of disks, each gang of disks being arranged in a row, and the said rows being parallel to each other, said gangs of disks being carried by the frame, operative connections between the said disks and the power producing device whereby the disks are driven, and means for independently raising and lowering the gangs of disks.

7. In a machine of the character described, the combination with a chassis, of an implement frame extending diagonally with respect to the chassis, an intermediate frame connected with the implement frame, and means for pivotally connecting the intermediate frame with the chassis.

8. In a machine of the character described, the combination with a chassis, an auxiliary frame extending transversely of the chassis and beneath the same, an implement frame extending diagonally with respect to the chassis, an intermediate frame secured to the implement frame, said intermediate frame being hingedly connected with the auxiliary frame.

In testimony whereof, we hereunto affix our signatures in the presence of two witnesses.

ROLLIN H. WHITE.
CLARENCE G. WHITE.

Witnesses for Rollin H. White:
　JESSY GRANT,
　REBECCA REISS.
Witnesses for Clarence G. White:
　LOUISE C. JONES,
　FLORENCE FISK WHITE.